Dec. 8, 1953   R. M. BUCKERIDGE   2,661,832
CONVEYER BELT BRAKE CONTROL SYSTEM
Filed March 29, 1951   6 Sheets-Sheet 3

NORMAL RUNNING CIRCUIT AFTER "START" BUTTON IS RELEASED AND AFTER TIME DELAY RELAY BECOMES ENERGIZED

Inventor
Roger M. Buckeridge
by Murray A. Gleeson
Attorney

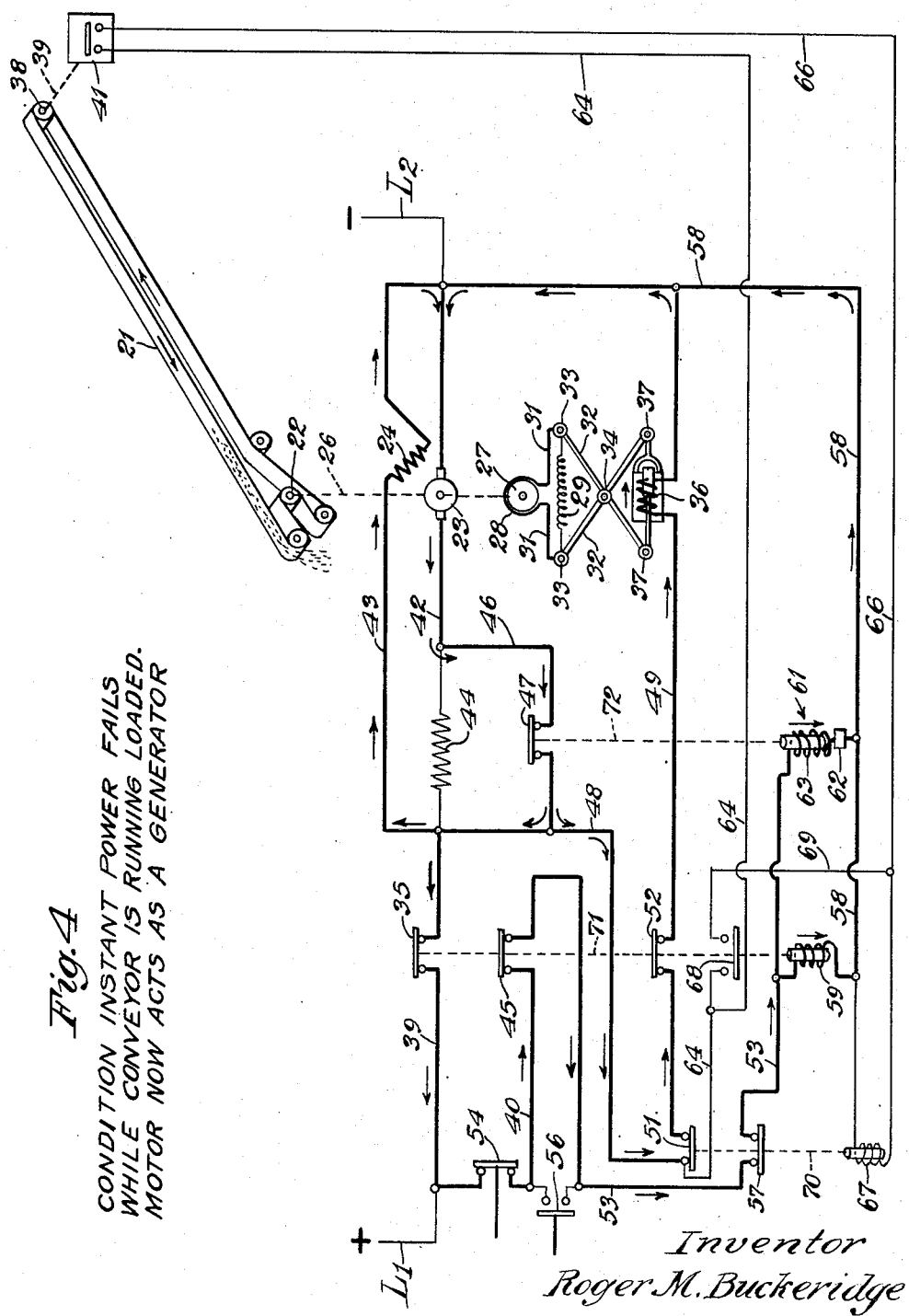

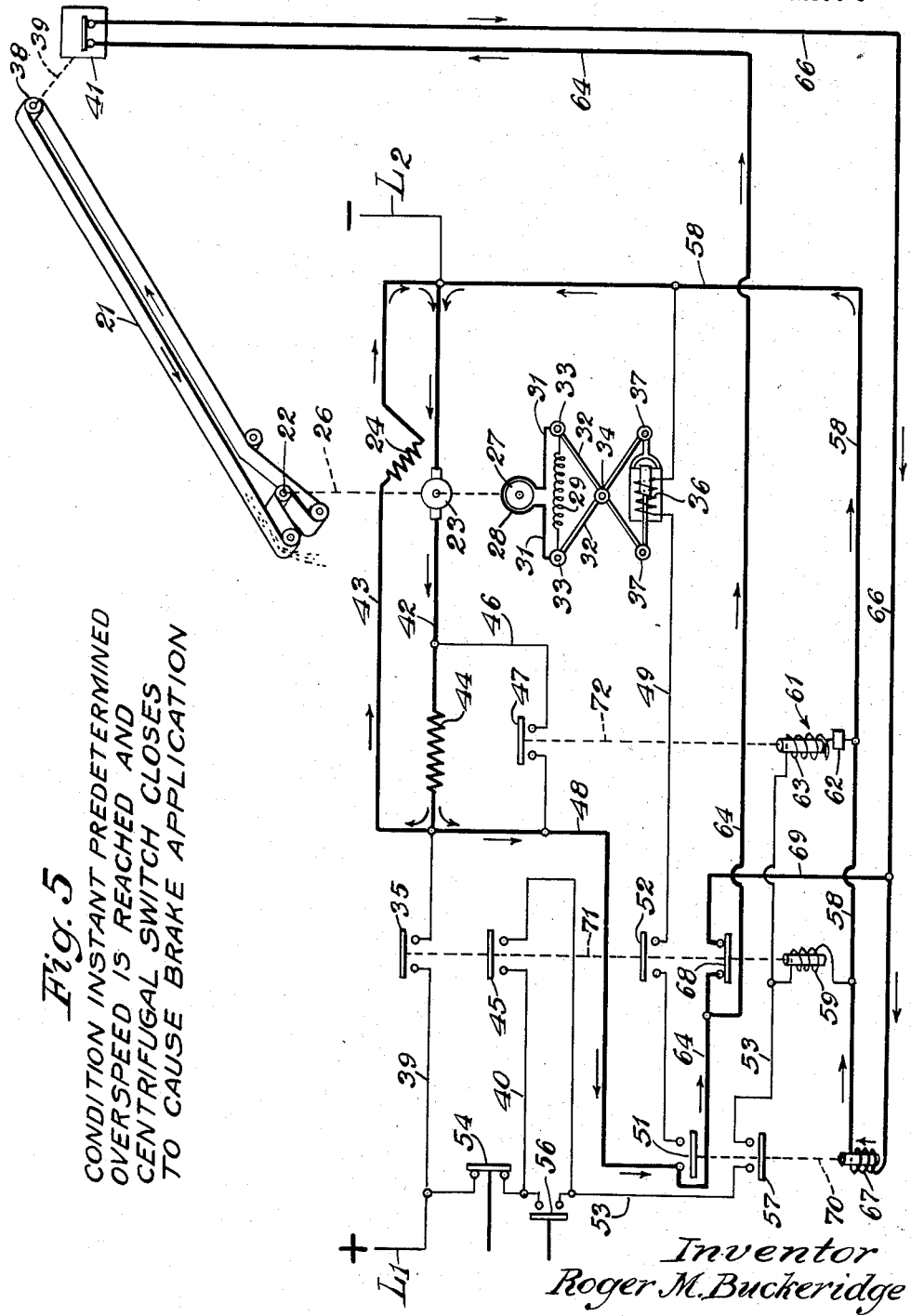

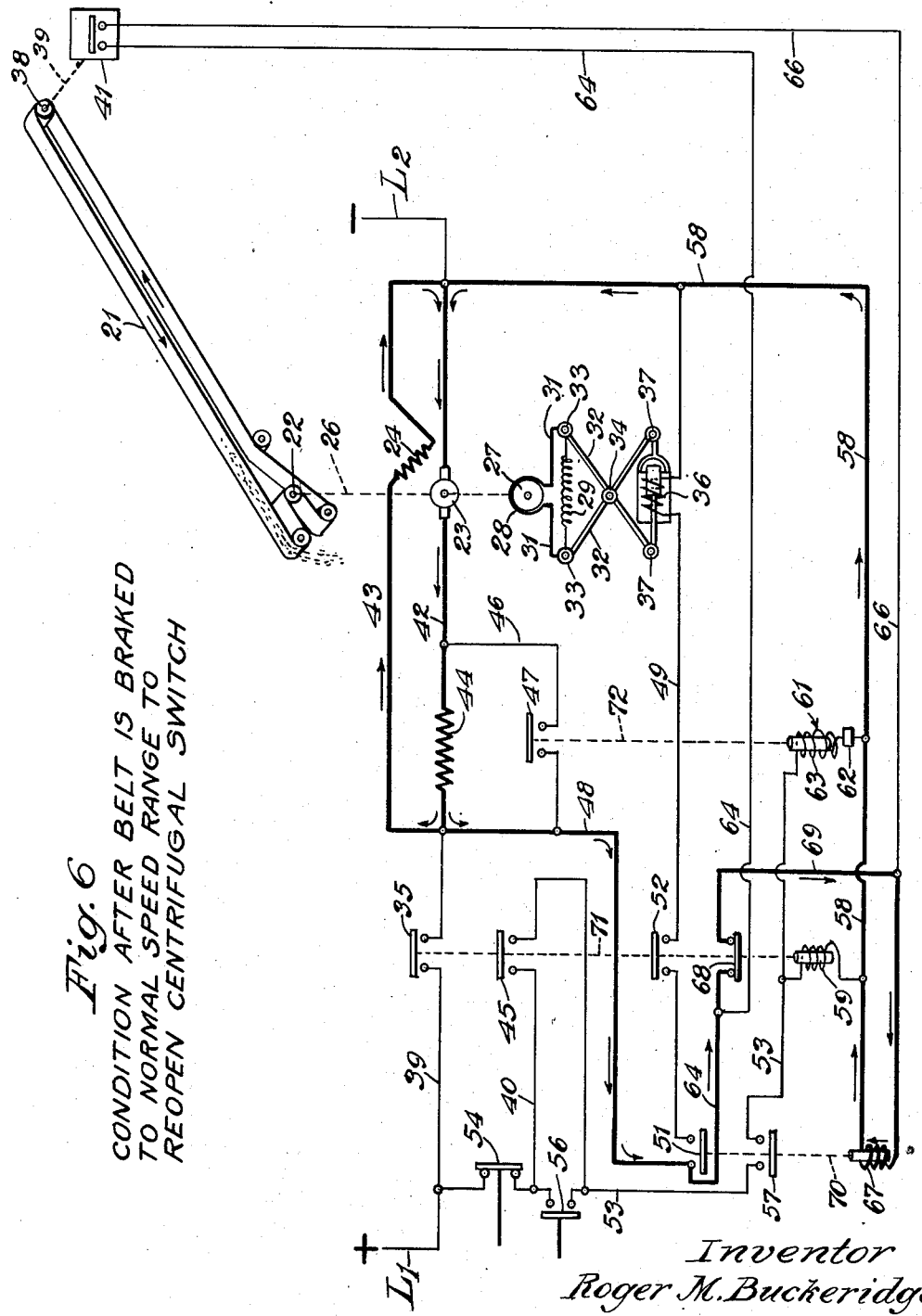

Patented Dec. 8, 1953

2,661,832

UNITED STATES PATENT OFFICE 2,661,832

CONVEYER BELT BRAKE CONTROL SYSTEM

Roger M. Buckeridge, Downers Grove, Ill., assignor to Goodman Manufacturing Company, Chicago, Ill., a corporation of Illinois Application March 29, 1951, Serial No. 218,244

7 Claims. (Cl. 198—203)

This invention relates generally to belt conveyors and particularly to a brake control system which prevents a loaded, down-grade conveyor from running away due to the weight of its load or upon power failure.

When a belt conveyor which operates down an appreciable grade is loaded and up to speed, it takes very little power to keep the load moving and sometimes it is necessary to use the motor as a dynamic brake, running as a generator, to keep the load from running away down-hill.

In order to stop the conveyor a brake is ordinarily provided, the brake being spring-applied to a "normally-on" position and being provided further with a control system including a solenoid which acts against the spring bias to hold the brake released when current is applied to run the motor. This usual type of brake control circuit is inherently hazardous in that the brake control solenoid must be de-energized to permit the brake to be applied; yet, when power failure occurs in a loaded down-grade conveyor it instantly begins running as a generator, supplying a back-flow of current into the control system which maintains the brake solenoid energized and which prevents the brake from being applied. A similar back-flow of current will hold the brake solenoid energized even if the conveyor runs away without power failure, making it impossible to apply the brake by actuating to "stop" switch. The conveyor goes faster and faster, running away downhill, throwing off its load and often damaging itself and even injuring workmen who happen to be nearby.

Accordingly, it is an object of the present invention to provide a brake control circuit which will positively prevent a loaded down grade conveyor from running away under load or upon power failure and which will not restart until the "start" control is manually operated. Another object is to provide a control circuit which will positively stop the belt at all times responsive to actuation of the "stop" control.

Figure 1:
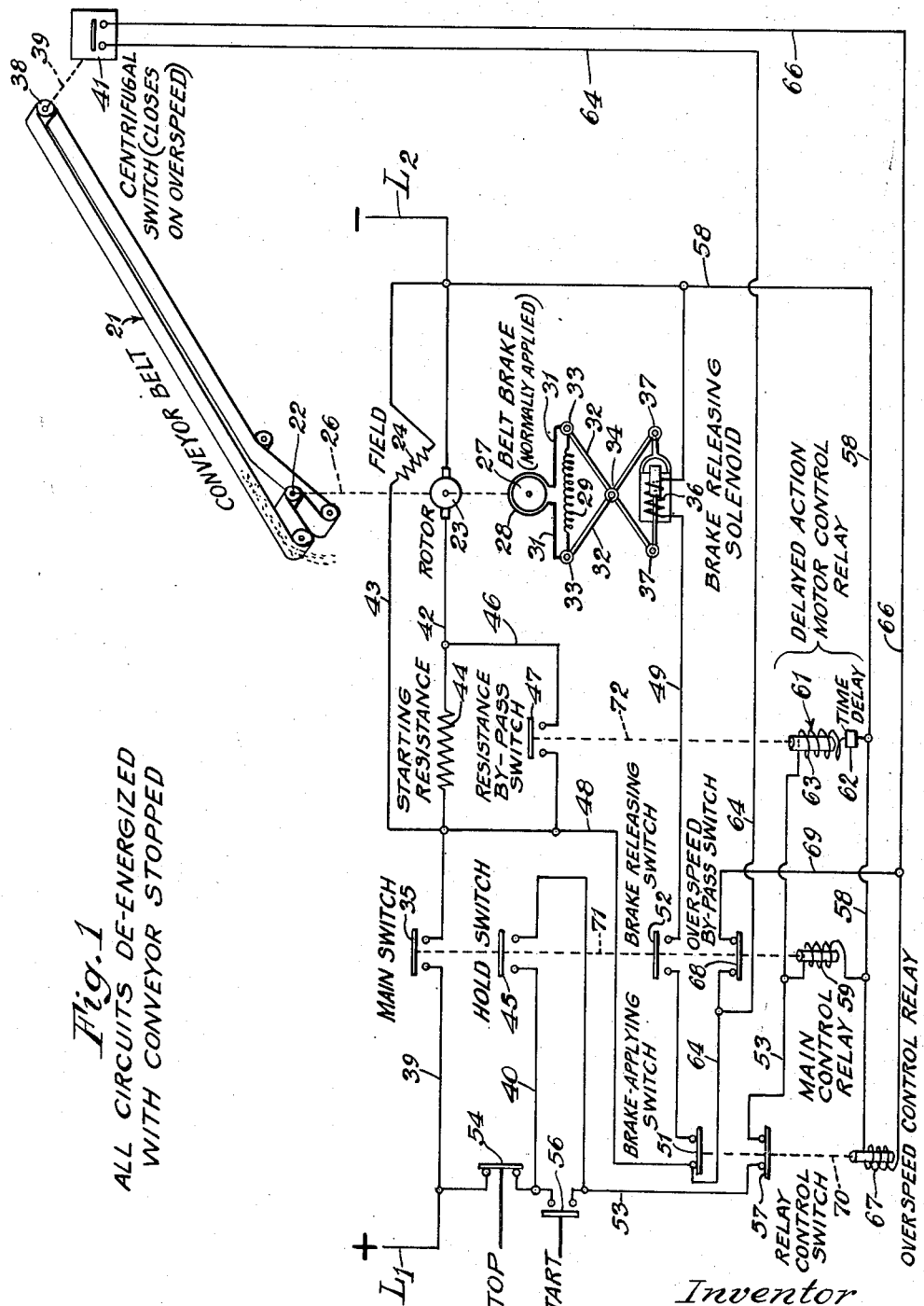

Other objects and advantages will be seen in the following description taken in connection with the drawings in which:

Figure 1 is a diagrammatic view of a belt control system illustrating one embodiment of the present invention, the condition shown being that where all circuits are de-energized and the conveyor is stopped; and Figs. 2, 3, 4, 5 and 6 are similar to Fig. 1 except showing the circuit in different operative conditions.

Referring now more particularly to the drawings, the numeral 21 designates generally a belt conveyor which is used to convey rock, coal, etc., down a slope. At its lower end the conveyor belt has a driving pulley 22 driven by motor means which in this case includes an armature 23 and a field coil 24. The broken line 26 on the drawings indicates a drive shaft. Also on the drive shaft is a belt drum 27 around which is wrapped a brake band 28 which is normally applied to the drum by spring 29 through arms 31, 31. To release the brake, at times, a pair of arms 32, 32 are each pivoted at a joint 33, to one of the arms 31. The arms 32 are crossed in scissors fashion and pivoted on one another at 34.

A brake releasing solenoid 36 is pivoted on the ends of arms 32 at joint 37 and is effective, when energized, to spread the arms and release the brake and maintain it in a released condition as long as the solenoid is energized.

At the upper end the conveyor belt is trained over a return roller 38 which, in this case, is connected by a shaft 39 to a centrifugal switch 41, the latter being normally open but set to close whenever the belt speed exceeds a predetermined maximum. For convenience here, the centrifugal switch is indicated as connected to the tail idler 38 but in an actual installation may be connected to a roller anywhere along the belt and ordinarily, the closer to the opposite or head end the better.

The main or motor circuit comprises lead-in lines $L_1$ and $L_2$ connected respectively to opposite poles of a direct current generating source (not shown). A conductor 39 having normally open main switch 35 connects to line $L_1$. The armature and field, 23 and 24 respectively, of the direct current motor are connected in parallel in conductors 42 and 43 between the conductor 39 and line $L_2$; a starting resistance 44 also being in conductor 42. The starting resistance is bypassed by a line 46 containing normally open bypass switch 47.

A brake control circuit includes lines 48 and 49 connected at one end (through conductor 39) to line $L_1$ and connected at the other end to line $L_2$. A brake-applying switch 51 and a brake releasing switch 52, being normally-closed and normally-open respectively, are connected in series with the coil of solenoid 36.

A relay circuit is likewise connected between lines $L_1$ and $L_2$ and comprises line 53 containing a normally closed "stop" switch 54, a normally open "start" switch 56, and a normally closed relay control switch 57. A line 58 provides a connection to the line $L_2$. A main control relay coil

3

59 is connected between lines 53 and 58. Similarly, a delayed action motor control relay is connected between lines 53 and 58 and is generally designated 61, being similar to coil 59 except that in addition a time delay element 62 is provided to delay operation of the coil portion 63 long enough to hold starting resistance 44 in series with the armature 23 while the motor is starting.

An overspeed circuit is likewise connected between lines L₁ and L₂ and includes conductors 39 and 48, previously described; lines 64 and 66 leading to and from the centrifugal switch 41; an overspeed control relay coil 67 connected between lines 58 and 66; and an overspeed by-pass switch 68 in line 69 connected in shunt between lines 64 and 66.

Switches 51 and 57 are interlocked for concurrent operation by the overspeed control relay 67 through an interlock designated 70. Likewise switches 35, 45, 52 and 68 are connected by an interlock 71 for concurrent operation by the main control relay 59. And switch 47 is operable through link 72 by the motor control relay 61.

*Operation*

In considering operation of the system above-described, refer first to Figure 1 which shows the system de-energized and with the conveyor stopped as would be the case when the conveyor belt 21 is not in operation.

Figure 2:
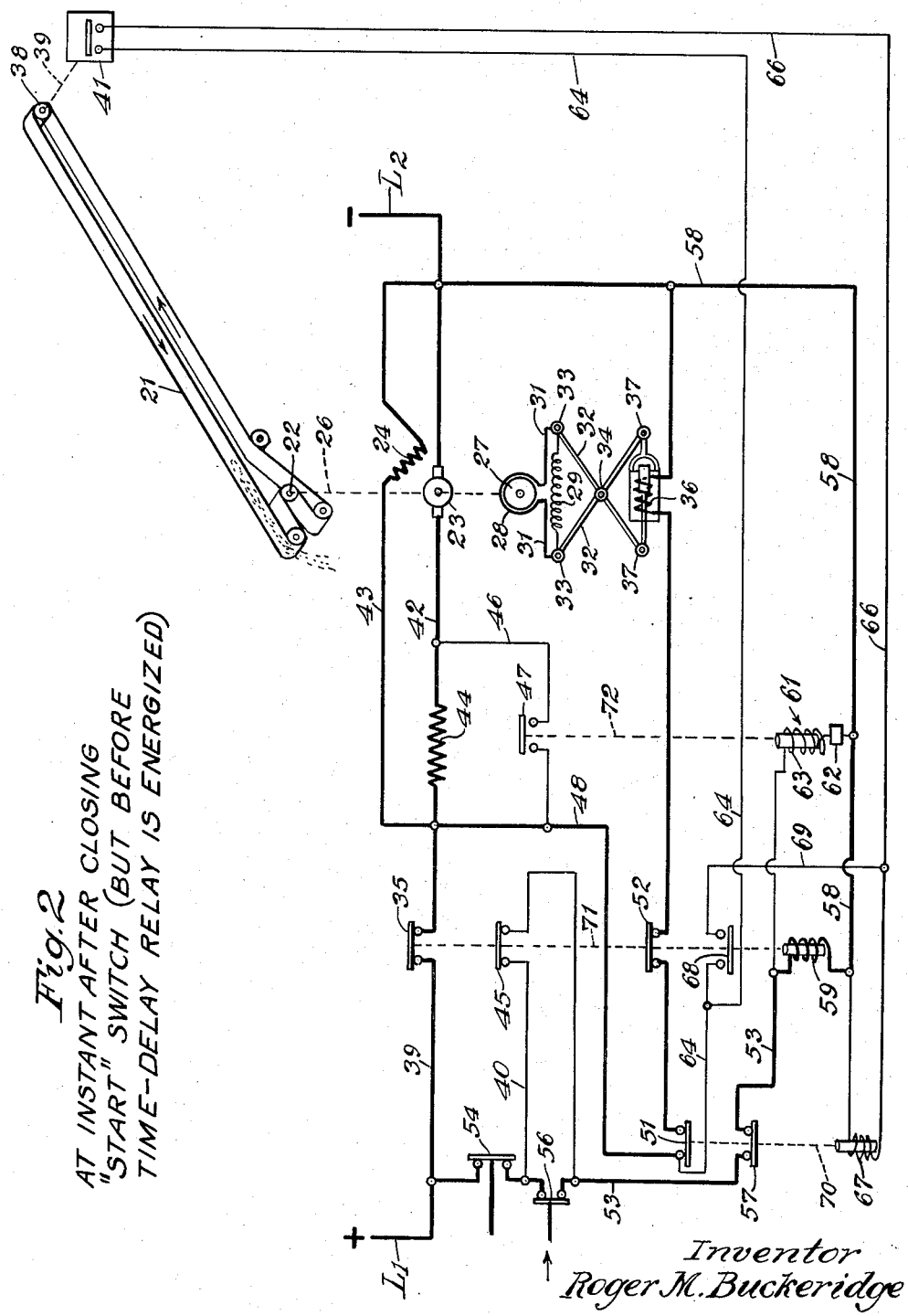

To start the belt the "start" switch 56 is closed. The energization of the system immediately after closing the start switch is shown in Figure 2 where it will be observed that the motor is energized through the starting resistance 44 because the delayed action motor control relay 61 has not yet closed the by-pass switch 47. The relay circuit is energized, causing the main control relay 59 to close switches 35, 45 and 52 and to open the switch 68. Closing of the brake releasing switch 52 causes the brake releasing solenoid 36 to be energized to thereby release the brake and permit the motor to run the conveyor.

Figure 3:
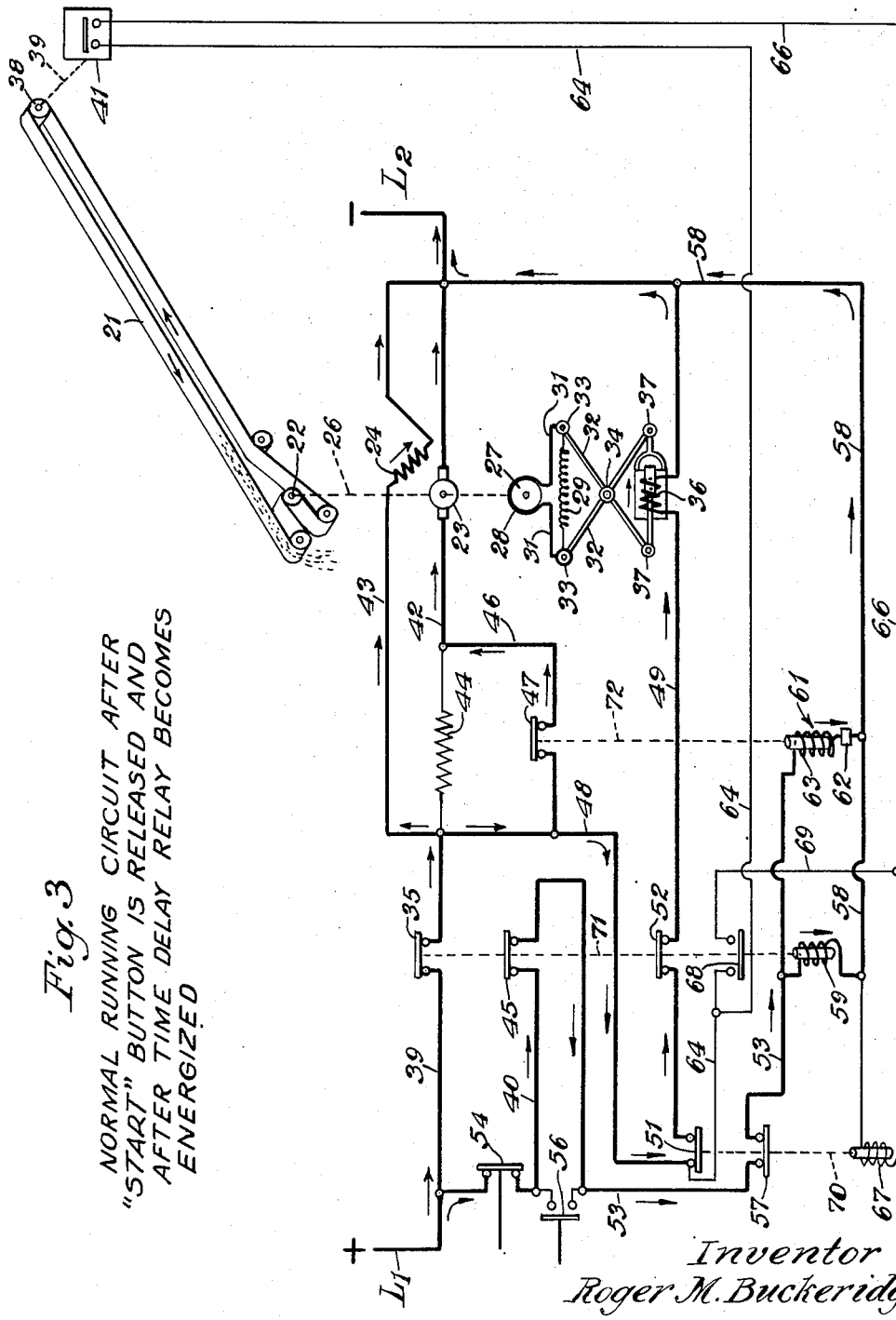

Figure 3 shows the next instantaneous step after the "start" button has been released to its normally open position and after the time delay relay 61 closes the by-pass switch 47. This is the normal running circuit in which the relay holding current is by-passed through the hold switch 45 and the rotor current passes through the by-pass line 46.

The direction of flow of current through the various major components of the system during the normal running operation is indicated by arrows in Fig. 3.

Figure 4 illustrates the condition the instant following power failure when the conveyor is running loaded. The motor now acts as a generator whereby current flows backwards through the rotor as indicated by the arrows in Fig. 4. In the other component of the system, however, the self-generated current runs in the same direction as in the normal condition shown in Fig. 3, as will be seen readily by comparing the direction of arrows in Figs. 3 and 4. Thus, the self-generated current, passing through coils 36, 59 and 63, will maintain the belt brake released until the centrifugal switch closes as will now be described.

If the conveyor is operating with a heavy load down a substantial grade when power fails, as described in connection with Figure 4, it will speed up and begin to run away. The centrifugal switch 41, however, will be set at a predetermined overspeed which prevents the run-away speed from becoming dangerous. As shown in Fig. 5, as soon as the predetermined overspeed is reached the centrifugal switch closes thereby energizing the overspeed control relay 67 to open both the brake applying switch 51 and the control switch 57. As soon as the switch 51 is open the circuit through the brake releasing solenoid 36 is de-energized to permit the brake to be applied. As soon as the brake is applied the conveyor begins to slow down. After it slows down below the speed at which the centrifugal switch reopens, the overspeed control relay 67 will be maintained energized through the by-pass switch 68 which is closed by reason of the de-energization of the main control relay coil 59. As the belt continues to slow down, it cannot be restarted upon restoration of power in the lines L₁ and L₂ for the reason that the relay control switch 57 is maintained open by energization of the overspeed control relay 67 by the self-generated current. In a particular instance, the relay 67 may have sufficient sensitivity to hold the relay circuit open until the belt slows down to 15 to 25 per cent of its full speed, at which time its drop-out voltage occurs and the system is again ready to be restarted by the switch 56 whenever power is returned to the lines L₁ and L₂.

As soon as the overspeed control relay 67 drops out by re-closing switches 51 and 57, the system is returned to the condition shown in Figure 1 and the cycle of operation is completed.

In the past, using conventional control systems, there have been cases where the belt conveyor has begun to run away under load and the operator unable to stop it by opening the "stop" switch. In the present case, the belt can positively be stopped because even the current self-generated when the conveyor runs away as shown in Fig. 4, passes through the "stop" switch. Thus, even after it begins to run away, but before it has reached an overspeed sufficient to actuate the overspeed switch 41, the "stop" switch will open the motor circuit and cause the brake to be applied, whether the overspeed occurs with or without power line failure (see Figs. 3 and 4).

While one form in which the present invention may be embodied has been shown and described it will be understood that various modifications and variations thereof may be effected without departing from the spirit and scope of the invention as defined by the appended claims.

I claim:

1. In an endless belt conveyor mechanism, an endless belt, an electric motor operable to drive said belt, a brake biased to retard said belt, a control system comprising: a main circuit connecting said motor to an E. M. F. source; a normally-open switch in said main circuit; a brake circuit having releasing means electrically energizable to release said brake against its bias; a normally-open switch in said brake circuit; electrically energizable relay means, effective, when energized, to close both of said switches; means for energizing said relay means; a normally-open speed-responsive switch actuatable to closed position responsive to increase of belt speed above a predetermined value; and other relay means having a coil energizable responsive to closing of said speed-responsive switch, and having contacts connected in said brake circuit and said main circuit opening upon energization of said coil and held open by voltage generated by said motor, to deenergize the first-mentioned relay means and said brake circuit for deenergizing the motor and accommodating the brake to be biased to retard the belt.

2. In an endless belt conveyor mechanism, an endless belt, an electric motor operable to drive said belt, a brake biased to retard said belt, a control system comprising: a main circuit including said motor; a brake for said belt having means biasing it toward an applied condition; electrically energizable brake control means associated with said brake and effective responsive to energization thereof to override said biasing means to release said brake; an overspeed circuit including speed responsive switch means closable upon predetermined belt overspeed to energize said overspeed circuit; relay means energizable responsive to energization of said overspeed circuit; an auxiliary circuit containing other relay means effective, when energized to energize said main circuit and said brake control means; said first mentioned relay means having contacts in said main circuit and said brake circuit, closed when de-energized and effective, when energized, to open said auxiliary circuit to deenergize said main circuit and brake control means to thereby stop said motor and apply said brake responsive to belt overspeed and said second mentioned relay means having contacts effective when said relay is de-energized to maintain said first mentioned relay means energized by the voltage generated by said motor.

3. In a conveyor mechanism including an endless belt, an electric motor for driving the belt, brake means biased to stop travel of the belt, control means for said brake means electrically energizable to hold said brake means against the bias thereof and including a solenoid operatively connected with said brake means, a first relay having first and second independent contacts for operating said motor and energizing said solenoid to hold said brake means in a released position, a coil for said relay for opening the contacts thereof, a second relay having a normally closed contact in series with said coil of said first relay and a second normally closed contact in series with said solenoid, and switch means operable responsive to excess speed of said motor and having contacts in series with said coil of said second relay for operating said relay, to simultaneously operate said brake means and de-energize said circuit to said motor.

4. In a conveyor mechanism including an endless belt, an electric motor for driving the belt, and brake means biased to stop travel of the belt, control means for said brake means energizable to hold said brake means against the bias thereof and including a solenoid operatively connected with said brake means, a relay having separate first and second normally closed contacts for maintaining said motor in operation and energizing said solenoid respectively, a coil energizable to operate said relay and open said contacts, speed responsive switch means driven by the endless belt and having normally open contacts in series with said coil and closing to energize said coil and de-energize said brake control means and the circuit to said motor, and another relay having a set of normally open contacts closing upon de-energization of the coil thereof and connecting the coil of said first relay in series with said motor and maintaining the coil of said first relay energized by the voltage generated by said motor until a reduction in the speed of said motor below a predetermined value.

5. In a conveyor mechanism including an endless conveyor belt, an electric motor for driving the belt, brake means biased to stop said belt, an electrically energizable control means for holding said brake means against the bias thereof and accommodating said belt for free operation comprising a solenoid connected in parallel with said motor, a relay having first and second independent contacts for operating said motor and energizing said solenoid, a coil for operating said relay, a second relay having a coil and a normally closed contact opening upon the energization of said coil and connected in series with said solenoid, said second relay also having a second normally closed contact in series with said coil of said first relay, a speed responsive switch driven by said conveyor and having normally open contacts in series with the coil of said second relay, and closing upon predetermined over speed conditions to energize said coil and open the contacts of said relay and de-energize said solenoid and coil of said first relay, and said first relay having a third contact normally open and closing upon de-energization of the coil thereof and connected in series with the coil of said second relay to maintain said coil of said second relay energized by the current generated by said motor.

6. In a conveyor mechanism, an inclined endless conveyor belt, an electric motor operable to drive said belt, and means operable upon a power failure to prevent said belt from running away when loaded comprising a brake for said belt biased toward an applied condition, electrically energizable brake control means associated with said brake and normally energized to override the bias of said brake and release the same, a control circuit for said motor including a main line conductor and a main relay having a coil and connecting said motor to said main line conductor upon energization of said coil, a second relay having a coil and two independent contacts closed upon de-energization of the coil thereof, one of said contacts connecting the coil of said first mentioned relay to said main line conductor, and an over speed circuit for said motor including the second of said contacts of said second relay, and an auxiliary conductor connecting said electrically energizable brake control means with said main line conductor through said second contacts, speed responsive switch means driven by said conveyor belt and having normally open contacts connected in series with the coil of said second mentioned relay and closing upon over speed conditions to energize said coil and open the contacts of said second relay and the circuit to the coil to said first relay and said electrically energizable brake control means to disconnect said motor from said main line conductors and accommodate said brake to be biased to an applied condition.

7. In a conveyor mechanism, an inclined endless conveyor belt, an electric motor operable to drive said belt, and means preventing said belt from running away when loaded upon a power failure comprising a brake for said belt biased toward an applied condition, electrically energizable brake control means associated with said brake and comprising a solenoid energizable to override the bias of said brake and release the same, a control circuit for said motor including a main line conductor, a relay having a coil connected to said main line conductor in parallel with said motor and having one set of contacts connecting said motor to said main line conductor upon energization of said coil, an auxiliary conductor connecting said solenoid to said main line conductor in parallel with said motor, a second relay having two sets of normally closed contacts, one set maintaining said coil of said first relay energized when closed and the other set maintaining said solenoid in parallel with said motor when closed, an overspeed circuit for said motor for energizing said coil of said second relay upon over-speed conditions to open the contacts thereof and de-energize said solenoid and the coil of said first relay, and thereby effect the application of said brake and the disconnection of said motor from said main line circuit and comprising a speed responsive switch driven by said conveyor and having normally open contacts in series with the coil of said second relay, and energizing said coil when closed, said first relay having a second set of contacts closing upon de-energization of the coil thereof and maintaining the coil of said second relay in the circuit to said motor upon the closing of said over speed switch and the de-energization of the coil of said first relay to maintain the coil of said first relay energized by the power generated by said motor.

ROGER M. BUCKERIDGE.

References Cited in the file of this patent

UNITED STATES PATENTS

| Number | Name | Date |
| --- | --- | --- |
| 1,682,052 | Radcliffe | Aug. 28, 1928 |
| 1,984,801 | Lindquist et al. | Dec. 18, 1934 |
| 2,460,017 | Lautrup et al. | Jan. 25, 1949 |